United States Patent [19]

Murch et al.

[11] 4,230,822

[45] Oct. 28, 1980

[54] FLAME-RETARDANT POLYURETHANE FOAMS

[75] Inventors: Robert M. Murch, Brinklow, Md.; Phyllis I. Meyer, Madison, Wis.; John J. Eagan, Ellicott City, Md.

[73] Assignee: W. R. Grace & Co., New York, N.Y.

[21] Appl. No.: 950,038

[22] Filed: Oct. 10, 1978

Related U.S. Application Data

[63] Continuation-in-part of Ser. No. 795,216, May 9, 1977, abandoned.

[51] Int. Cl.$^3$ .............................................. C08G 18/14
[52] U.S. Cl. .................................... 521/106; 521/107; 521/108; 521/109; 521/117; 521/118; 521/123
[58] Field of Search ............... 521/123, 106, 109, 117, 521/118, 107, 108

[56] References Cited

U.S. PATENT DOCUMENTS

| | | | |
|---|---|---|---|
| 3,956,202 | 5/1976 | Iwasaki | 521/123 |
| 4,066,578 | 1/1978 | Murch et al. | 521/123 |

FOREIGN PATENT DOCUMENTS 1429711  3/1976  United Kingdom .

*Primary Examiner*—Maurice J. Welsh
*Attorney, Agent, or Firm*—Edward J. Cabic

[57] ABSTRACT

Improved hydrophilic crosslinked polyurethane foams are prepared by reacting (a) an isocyanate-capped polyoxyethylene prepolymer with (b) at least 20 moles of water per mole of NCO groups in the presence of (c) alumina hydrate, (d) a phosphorus fire-retardant additive and (e) an organic carbon compound which serves to react with phosphate anions at high temperatures (e.g., in the presence of a flame) and reinforces the char provided by combustion of the foam.

27 Claims, No Drawings

FLAME-RETARDANT POLYURETHANE FOAMS

REFERENCE TO RELATED APPLICATIONS

This application is a continuation-in-part of application Ser. No. 795,216, filed May 9, 1977, now abandoned.

Commonly assigned application Ser. No. 588,092, now abandoned, discloses polyurethane foams containing a synergistic combination of alumina hydrate with a phosphorous compound. U.S. Pat. No. 4,066,578 discloses a system using reagents similar to those employed in Ser. No. 588,092 and additionally discloses the use of a system of surfactants and suspending agents which makes the combination of alumina hydrate and the phosphorous compound more effective. U.S. Pat. No. 3,897,372 discloses the use of flame-retardant additives such as melamines, borates, etc.

BACKGROUND OF THE INVENTION

The invention relates to improvement in the flame-retardant character of polyurethane foams and specifically hydrophilic foams based on polyurethanes having a polyoxyethylene backbone. Such foams are well known in the art. The object of the invention is to increase the flame-retardancy of such foams by incorporating various additives which are believed to strengthen the char evolved during combustion.

A relevant prior art reference is H. Z. Vandersall, *Journal of Fire and Flammability*, 279 (1971) describing the state of the art in intumescent paint chemistry. At pages 101 and 104 of this article, formulations employing carbonizable compounds such as starch are described.

Flame retardance additives have been described in U.S. Pat. No. 3,455,850 (porous filler coated with ammonium polyphosphate); U.S. Pat. No. 3,629,162 (whey); U.S. Pat. No. ,3,639,307 (fumaric acid); U.S. Pat. No. 3,826,762 (inert filler, halogen source, phosphorous-containing compound); U.S. Pat. No. 3,865,760 (alumina trihydrate plus source of calcium or borate radicals); U.S. Pat. No. 3,897,372 (melamine - mentioned above); U.S. Pat. No. 3,909,464 (antimony oxide, alumina trihydrate, polyhalogenated aromatic compound); and U.S. Pat. No. 3,810,851 (alumina trihydrate or antimony trioxide in PVC polyurethane foams). U.S. Pat. Nos. 3,021,290 and 3,051,601 describe the use of talc or wood cellulose to provide flexible polyurethane foams having improved load bearing capacity. U.S. Pat. No. 3,573,234 describes the use of sodium carboxymethylcellulose and related compounds to increase the hydrophilic character of polyurethane foams.

DESCRIPTION OF THE INVENTION

The invention is an improvement over prior art polyurethane foams prepared by reacting a hydrophilic polyoxyalkylene urethane prepolymer under foam-forming conditions at ambient temperature with at least 6.5 moles of water for every mole of NCO groups in the prepolymer. To impart fire-retardancy, said reaction can be carried out in the presence of alumina hydrate and a phosphorous fire-retardant compound as described in the copending application and patents referenced above. The present invention is an improvement over past technology in that the foam-forming reaction is carried out in the presence of a combustible and water-dispersible organic carbon compound having from about 0.1 to about 1.0 hydroxyl groups for every carbon atom present in said compound. The hydroxyl group-containing carbon compound, hereafter referred to as the carbon compound, can be added to the aqueous dispersion from about 5 to about 30 parts based on the weight of 100 parts of the prepolymer. A preferred embodiment utilizes wood cellulose in the form of ground wood or wood flour pulp. This wood pulp can be used in an amount of about 2 to about 10 parts by weight based on the weight of 100 parts of the prepolymer, with especially good results obtained in the range of about 4 to about 5 parts. The carbon compound can be either solid at temperatures below about 50° C. or it can be sorbed onto solid particles to insure that the compound does not migrate out of the polyurethane foams under normal operating conditions, e.g., as where the foam is used as a mattress or a seat cushion. Also the carbon compound should provide an essentially neutral pH when dissolved or dispersed in water.

The amount of the carbon compound added to the aqueous dispersion will be selected so it does not cause excessive thickening of the aqueous dispersion. Furthermore, the carbon compounds are to be selected and the amount employed controlled so that when they are added to the water, the resulting mixture continues to behave as a liquid. Thus carbon compounds would not be employed in the ranges taught herein if they function as a gelatinizing agent.

By the term "essentially neutral" it is meant that the pH of an aqueous mixture or solution of the carbon compound is from about 5 to about 7.5. As employed in the present application, the term "combustible" means a material that will char on exposure to a flame. The term "solid" used in relation to the carbon compound is intended to designate compounds which are actually solid or sufficiently viscous that they will not flow under normal operating conditions of the foam, e.g., temperatures below about 50° C. Additionally, the term "solid" is intended to include materials that behave like solids in that they do not flow and are not appreciably vaporized (.e.g., less than 1% lost from foams by evaporation, sublimation or flowing out of the foams) at temperatures of 50° C. and below, e.g., certain of the polyols described herein have a relatively low viscosity but may be sorbed onto the surface of the alumina hydrate particles—or the surfaces of other particulate additives present—and thereby behave as solids. The term "water-dispersible" is intended to mean that the carbon compound is soluble or miscible with water or can be dispersed in water with the aid of common surfactants.

While the theory behind the success of the present invention is not fully understood, it is believed that on combustion the polyurethane foams evolve considerable quantities of gases which are combustible and serve to feed the flame front. Normally the char provided by foams intended to be flame retardant acts to shield portions of the foam from the flame front as well as to absorb some of the fuel gases thereby reducing the amount available for the flame. However, it is believed that, due to the velocity of the combustion as well as other factors, the char tends to slough off and expose more of the polymer to combustion. Such sloughing off also removes the char from the path of the combustion gases so that absorption is reduced. It is believed that hydroxyl groups of the organic carbon compound serve to react with anions produced by the phosphorous compound under conditions of combustion. This reaction may result in crosslinking of the carbon compound as it is incorporated into the char. The crosslinking reaction may serve to reinforce the char and prevent or minimize sloughing off.

Note that the carbon compound is added to the system after the prepolymer has been formed. When the aqueous phase contacts the prepolymer under generally ambient conditions to rapidly form the foam, it is believed the polymeric foam forms without any significant amount of the carbon compound being chemically incorporated into the polymer either in the polymer chain or as a crosslinking agent between chains. Thus the physical properties of the foam are not adversely affected by the incorporation of the carbon compound into the polymer structure. The hydroxyl groups of the carbon compound advantageously remain substantially unreacted in the foam so they can later react with the anions produced by the phosphorous compound under conditions of combustion as discussed above.

In the present specification and especially in the following description of the various components employed in the foams, reference to "parts" or "parts by weight" refers to parts by weight based on 100 parts by weight of the urethane prepolymer employed.

In practicing the invention the carbon compound employed must have an OH/C mole ratio of at least 0.1:1 and preferably from about 0.3:1 to about 0.8:1. The carbon compound must also be water-dispersible (as defined above) so that the foam can be uniformly protected. In general, the total amount of the carbon compound employed must reach at least 5 parts by weight to provide any benefit. However, if the amount of carbon compound employed is too great, the flame-retardant contribution of the alumina/phosphorous compounds will be overcome. Therefore, the upper limit on the amount of carbon compound employed is about 30 parts by weight. Preferably from about 10 to about 25 parts are employed. When using wood cellulose a lower amount can be employed from about 2 to 10 parts with a preferred range of 4 to 5 parts.

Suitable carbon compounds include aliphatic alcohols having at least 2 hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine, and methylol melamine. Suitable saccharides include: starch, sorbitol, dextrin, flour, cellulose (including wood cellulose and its ground form, known as wood flour), mannitol, sucrose, inositol, and arabinose. Suitable phenols (i.e., aromatic hydroxyl compounds) include: resorcinol, lignin, hydroquinol, trimethylolbenzene, pyrogallol, catechol, and phloroglucinol. If undue thickening action occurs in the aqueous phase through use of any of the above carbon compounds, the amount of the compound employed should be reduced to permit adequate processing.

From about 50 to about 400 parts of alumina hydrate are employed, and preferably from about 100 to about 275 parts. Satisfactory alumina hydrates (also called hydrated aluminas) are highly refined, inorganic white granular crystalline powders with the chemical formula of $Al_2O_3 \cdot XH_2O$, such as $Al_2O_3 \cdot 3 H_2O$. Such materials are produced by the Bayer process from bauxite ore and may contain small amounts of soda, iron oxide and silica. Suitable alumina hydrates as described above are chemically inert and frequently are employed as inert fillers. Generally, the alumina hydrate is employed in particulate form with an average particle size of from about 0.5 to about 120 microns. Particles of about 6.5 to about 9.5 microns are particularly useful.

The phosphorous-containing additive is employed at levels of from about 1 to about 40 parts by weight and preferably at about 5 to about 20 parts. Suitable phosphorous-containing compounds include phosphites, polyphosphites, ammonium phosphates, polyphosphates, phosphate salts, organic phosphates, phosphonates and polyphosphonates, and mixtures thereof. Suitable phosphorous compounds are more fully described in U.S. Pat. No. 4,066,578, incorporated herein by reference.

Preparation of foams according to the invention is illustrated in the examples. Preferably it starts by dissolving or dispersing the phosphorous compound in the urethane prepolymer. The alumina hydrate is dispersed in water. Subsequently the two phases are combined to prepare the foam. As described in U.S. Pat. No. 4,066,578 referred to above, a suspending agent for the alumina hydrate is generally included in the aqueous phase. The use of such a surfactant is optional. A surfactant can also be included in the organic phase. The suspending agent for the alumina hydrate is generally a non-ionic surfactant, whereas any surfactant included in the organic or aqueous phases to influence cell size or structure is a non-ionic, cationic or amphoteric surfactant. The surfactant should not be anionic. From about 0.1 to about 2 parts of the non-ionic suspending agent are employed, and from about 0.01 to about 2 parts of the non-ionic, cationic or amphoteric surfactant are employed.

Suitable non-ionic surfactants/suspending agents, often described as solution thickeners, include but are not limited to non-ionic cellulosic polymers such as hydroxyethyl cellulose polymers (e.g., Natrosol by Hercules or Cellosize by Union Carbide), hydroxypropyl cellulose (e.g., Klucell by Hercules), ethylhydroxyethyl celluose, (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar.

Examples of suitable amphoteric and cationic surfactants are set forth in U.S. Pat. No. 4,066,578, which has been incorporated by reference into the present application. Suitable non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FSN by E. I. du Pont), condensates of ethylene oxide and propylene oxide with propylene glycol (e.g., Pluronic L62, Pluronic L64, Pluronic P75 by BASF Wyandotte), and organosilicone surfactants (e.g., L520 by Union Carbide).

The fire-retardant polyurethane foams prepared by the invention have numerous advantages. Specifically, it is believed that the chars are stronger and more resistant to removal as described earlier. Additionally, many of the foams, while containing appreciable quantities of particulate and normally "dusty" additives, are relatively non-dusty, especially in comparison to foams loaded to similar levels but not utilizing the invention. Additionally, the carbon compound employed along with the alumina hydrate and phosphorous compounds exhibit good resistance to leaching. Foams prepared according to the invention are generally open celled and may be rigid, semi-rigid or flexible, depending upon the level of crosslinker and amounts of additives employed. Cell structure and the degree of rigidity of polyurethane foams do not form part of the present invention, and techniques for achieving desired results are well known.

With regard to formulating mattresses, for example, E. N. Doyle in "*The Development and Use of Polyurethane Products*" (McGraw Hill 1971) describes at pages 251-254 various parameters to be selected. Similarly, parameters for seat cushions are also described in this same section.

OXYALKYLENE PREPOLYMERS

Polyether polyurethane prepolymers employed are hydrophilic, i.e., usually at least 40 mole percent of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole percent of oxyethylene units (excluding initiators at branch-points) as described above. Where the oxyethylene content is from about 60 to 75 mole percent, it may be desirable to use a surfactant such as those specified earlier to promote dispersion of the prepolymer in water prior to foaming.

As described above, the foams of the present invention are based on the prepolymer technique. Suitable prepolymers are prepared by capping a polyoxyalkylene polyol with an excess of polyisocyanate, e.g., toluene diisocyanate. Prior to capping, the polyol preferably has a molecular weight of from about 200 to about 20,000 and more preferably from about 600 to about 6,000. The hydroxy functionality of the polyol and the corresponding isocyanate functionality following capping is from about 2 upwards, usually not exceeding about 8. If foams are formed from prepolymers with an isocyanate functionality of about 2, the resulting foam is essentially linear and does not have as much tensile strength as crosslinked foams. Accordingly, if the isocyanate functionality is about 2, a crosslinker can be employed, although the linear non-crosslinked foams are operable in the present invention. Suitable crosslinkers are well known in the polyurethane art and include by way of example tolylene-2,4,6-triamine, ethylene diamine, diethanolamine, diethylenetriamine, triethylenetetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. As discussed above, mixtures of ethylene oxide with other alkylene oxides can be employed so long as the mole percent of ethylene oxide is at least 40 percent. Also as stated, it may be desirable to use crosslinkers with these systems, in which case the crosslinker can be included in the water into which the prepolymer is dispersed. Where the linear polyethers are mixtures of ethylene oxide with, e.g., propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, penaterythritol, etc. In forming the polyol B, the alkylene oxide used can be ethylene oxide or mixtures of ethylene oxide with other alkylene oxides as described above. One preferred prepolymer is a mixture of a polyoxyethylene glycol and a polyhydric alcohol containing 3 or 4 hydroxyl groups per mole. Useful polyols can be further exemplified by (C) linear branched polyfunctional polyols as exemplified in A and B above together with an initiator or crosslinker. A specific example of C is a mixture of polyethylene glycol (m.w. about 1,000) with trimethylolpropane, trimethylolethane or glycerine. This mixture can be subsequently reacted with excess polyisocyanate to provide a prepolymer useful in the invention. Alternatively, the linear or branched polyols, (e.g., polyethylene glycol) can be reacted separately with excess polyisocyanate. The initiator, e.g., trimethylolpropane, can also be separately reacted with polyisocyanate. Subsequently, the two capped materials can be combined to form the prepolymer.

Suitable polyisocyanates useful in preparing prepolymers include toluene-2,4,-diisocyanate, toluene-2,6-diisocyanate, commercial mixtures of toluene-2,4-and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluene-triisocyanate, and p,p'p"-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1,-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5, 1,1,1-tris[(2-hydroxyethoxy)-methyl]ethane, 1,1,1,-tris-[(2-hydroxypropoxy)methyl]-propane, triethanolamine, triisopropanolamine, resorcinol, pyrogallol, phloroglucinol, hydroquinone, 4,6-ditertiarybutyl catechol, and catechol.

TEST METHODS

A. Limiting Oxygen Index (LOI) is determined by the modification of ASTM D2863-74 described by Beatorewicz and Hughes, *Journal of Fire and Flammability* 2, 259 (1971).

B. The E-162 Flame Spread Index refers to the value developed when conducting ASTM-E-162-67.

C. The Butler Chimney rating refers to the weight retained when conducting ASTM D 3014-74.

D. Foams are tested for dustiness by clamping the foam in a fixed position and beating with a rotating paddle for one minute. The paddle blade impinges upon the foam approximately 200 times per minute. The shape and size of the paddle blade are as follows: rectangular, 3"×1½"×¼" (76×38×6.3 mm.). The dimensions of the foam sample tested were 3"×1"×½" (76×25×12.5 mm.). Foams are classified as dusty if they lose more than 5 percent of their weight during this test.

E. The leachability of the flame-retardant foams is determined by mechanically depressing the foam 75 times under water during a one-minute period. The dimensions of the sample used in testing are 3"×1"×1" (76×25×25 mm.). Subsequently, the sample is removed from the water and dried. A weight loss of greater than 10 percent, as compared with the sample weight prior to immersion in the water, is unsatisfactory and indicates that the additive is only loosely bound into the foam.

TRADE NAMES USED IN THE EXAMPLES

Aliquat 221—n-fatty trimethyl quaternary ammonium chloride by General Mills.
Antiblaze 78—chloroethyl phosphonate oligomer by Mobil.
Arlacel 85—sorbitan trioleate by ICI.
Brij 72—polyoxyethylene stearyl ether by ICI.
Fyrol HB32—tris-2,3-dibromopropyl phosphate by Stauffer Chemical.
Natrosol 250HH—hydroxyethyl cellulose by Hercules.
PAPI 135—polyarylpolyisocyanate by Upjohn.
Phoschek P/30—ammonium polyphosphate by Monsanto.
Pluronic L-62, Pluronic L-64, Pluronic P-75—condensates of ethylene oxide and propylene oxide with propylene glycol by BASF Wyandotte.

PREPARATION OF PREPOLYMERS

Prepolymer A is prepared by admixing 2 molar equivalents of polyethylene glycol having an average molecular weight of 1,000 (PEG - 1,000) and 0.66 molar equivalents of trimethylolpropane (TMOP). The admixture is dried at 100°-110° C. under a pressure of 5-15 Torr to remove water. The resulting dried mixture is slowly added over a period of about one hour to a vessel containing 5.7 molar equivalents of toluene diisocyanate (TDI) while stirring the TDI and polyol mixture. The temperature is maintained at 60° C. The mixture is maintained at 60° C. with stirring for 3 additional hours. Then an additional 0.92 molar equivalent of TDI is added with stirring over a period of about one hour while maintaining the temperature at 60° C. The final reaction mixture contains a 5 percent molar excess of TDI. All hydroxyl groups are capped with isocyanate and some chain extension occurs because of crosslinking of the polyols with TDI.

Prepolymer B is prepared by admixing 2 molar equivalents of polyethylene glycol having an average molecular weight of 1,000 (PEG - 1,000) and 1 molar equivalent of trimethylolpropane (TMOP). The admixture is dried at 100°-110° C. under a pressure of 5-15 Torr to remove water. The resulting dried mixture is slowly added over a period of about one hour to a vessel containing 6.65 molar equivalents of toluene diisocyanate (TDI) while stirring the TDI and polyol mixture. During addition the temperature is maintained at about 60° C. The mixture is maintained at 60° C. with stirring for an additional 3 hours. THen 5 parts per 100 (based on the combined weight of TDI, PEG and TMOP) of PAPI 135 is added with stirring. In the final reaction mixture, all hydroxyl groups are capped and some chain extension has occurred.

Prepolymer C is prepared by admixing 2 molar equivalents of polyethylene glycol having an average molecular weight of 1,000 (PEG - 1,000) and 0.67 molar equivalents of trimethylolpropane (TMOP). The admixture is dried at 100°-110° C. under a pressure of 5-15 Torr to remove water. The resulting dried mixture is slowly added over a period of about one hour to a vessel containing 5.7 molar equivalents of toluene diixocyanate (TDI) while stirring the TDI and polyol mixture. The temperature is maintained at 60° C. with stirring for 3 additional hours. All hydroxyl groups are capped with isocyanate and some chain extension occurs because of crosslinking of the polyols with TDI.

EXAMPLE 1

To demonstrate the flame-retardant foams of the invention a foam was prepared as follows. An aqueous dispersion was formed by mixing 0.35 g. of Pluronic P-75, 20 g. of Phoschek P/30, 20 g. of starch and 50 g. of alumina trihydrate in 100 g. of water. This admixture was chilled to approximately 15° C. and mixed for 1 minute with a motor-driven propellor blade to provide an essentially homogenous aqueous dispersion. This dispersion was added to 100 g. of Prepolymer A at 25° C. The reactants were stirred as thoroughly as possible and after creaming of the reaction mixture, the sample was poured into a mold where foam formation took place. After the foam has been tack-free, the sample was dried in a microwave oven for 5 minutes and was then placed in a 70° C. vacuum oven overnight. Appropriate samples were cut for testing and were conditioned for 24 hours at 25° C. and 50 percent relative humidity. The LOI was found to be 36.3. The sample density was 8.9 lbs./ft.$^3$ (0.143 g/cm$^3$). The foam formed a strong char upon burning which resisted abrasion and remained intact during flammability testing.

EXAMPLE 2—COMPARATIVE EXAMPLE

The organic polymer consisted of 100 g. of Prepolymer A. The aqueous phase contained 100 g. of distilled water, 50 g. of alumina trihydrate, 20 g. of Phoschek P/30, and 1 g. of potato starch. Subsequently, a foam was prepared and tested as in Example 1. The LOI was 27.4. The char formed upon burning was weak and friable.

EXAMPLE 3

An organic phase was prepared by admixing 100 g. of Prepolymer B with 16 g. of tris-2,3-dibromopropyl-phosphate, 16 g. of Antiblaze 78, and 0.15 g. of Aliquat 221. An aqueous phase was prepared by admixing 100 g. of distilled water, 100 g. of alumina trihydrate, 10 g. of potato starch and 0.15 g. of Natrosol 250HH. The admixture was agitated for 60 seconds as in Example 1 and was then blended into the organic phase. During the cream phase, the sample was poured into a mold. After curing, the sample was placed in a microwave oven for 5 minutes and dried overnight in a 70° C. vacuum oven. Subsequently, the sample was cut for testing and conditioned as in Example 1. The LOI was 38.5 and the E-162 Flame Spread Index was 10. Butler Chimney weight loss was >5 percent. Losses due to dusting and water extraction were 1 percent and 5 percent respectively.

EXAMPLE 4

An organic phase was prepared by admixing 100 g. of Prepolymer B, 12 g. of tris-2,3-dibromopropylphosphate, 12 g. of Antiblaze 78 and 0.3 g. of Aliquat 221. The aqueous phase contained 100 g. of distilled water, 150 g. of alumina trihydrate, 5 g. of Phoschek P/30, 10 g. of potato starch and 0.3 g. of Natrosol 250HH. Subsequently, a foam was prepared and tested as in Example 1. The LOI was 55.5. The Butler Chimney weight loss was 5 percent. Dusting and leaching losses were 1.4 percent and 10.5 percent respectively.

EXAMPLE 5

An organic phase was prepared by admixing 100 g. of Prepolymer B, 16 g. of tris-2,3-dibromopropylphosphate and 0.2 g. of Aliquat 221. The aqueous phase contained 100 g. of distilled water, 100 g. of alumina, 16 g. of Phoschek P/30, 10 g. of potato starch and 0.2 g. of Arlacel 85. Subsequently, a foam was prepared and tested as in Example 1. The LOI was 40.7. Dusting loss was less than 1 percent. The char remained intact during the flammability testing.

EXAMPLE 6—COMPARATIVE EXAMPLE

An organic phase was prepared by admixing 100 g. of Prepolymer B, 16 g. of tris-2,3-dibromopropylphosphate and 0.2 g. of Aliquat 221. The aqueous phase contained 100 g. of distilled water, 100 g. of alumina trihydrate, 16 g. of Phoschek P/30 and 0.2 g. of Arlacel 85. Subsequently, a foam was prepared and tested as in Example 1. The LOI was 37.6. Dust loss was greater than 20 percent. The char was weak and friable.

EXAMPLE 7

To demonstrate the flame-retardant foams of the preferred embodiment, a foam was prepared as follows. An aqueous dispersion was formed by mixing 1.0 g. Brij 72, 1.0 g. Pluronic L-64, 0.3 g. Natrosol 250HH, 5.0 g. bleached ground wood pulp (obtained from Woodpulp Inc.), 20 g. Phoschek P/30 and 130 g. alumina trihydrate in 100 g. water. This admixture was mixed for 1 minute with a motor-driven propeller blade to provide an essentially homogenous aqueous dispersion. An organic phase was prepared by admixing 100 g. of Prepolymer C and 9.0 g. Antiblaze 78. The reactants were stirred as thoroughly as possible and after creaming of the reaction mixture the sample was poured into a mold where foam formation took place. After the foam had been tack-free, the sample was dried in a microwave oven for 5 minutes and was then placed in a 70° C. vacuum oven overnight. Appropriate samples were cut for testing and were conditioned for 24 hours at 25° C. and 50 percent relative humidity. The LOI was found to be 59.0. The sample density was 12.0 lbs./ft. (0.192 g/cm$^3$). The foam formed a strong char upon burning which resisted abrasion and remained intact during flammability testing.

EXAMPLE 8

A foam was prepared as in Example 7, with the exception that 5.0 g. wood flour was substituted for 5.0 g. bleached ground wood pulp in the aqueous phase. The sample was dried, conditioned and tested as in Example 7. The LOI was 53.0. The char formed upon burning was strong and remained intact during flammability testing.

EXAMPLE 9

A foam was prepared as in Example 7 with the exception that 2.0 g bleached ground wood pulp was used in the aqueous phase. The sample was dried, conditioned and tested as in Example 7. The LOI was 44.0. The char was weak but remained intact during flammability testing.

What is claimed is:

1. In a crosslinked hydrophilic flame-retardant polyurethane foam prepared by reacting a hydrophilic polyoxyalkylene urethane prepolymer under foam-forming conditions with at least 20 moles of water for every mole of NCO groups in the prepolymer and in the presence of alumina hydrate and a phosphorous fire-retardant compound with said alumina hydrate carried in the water phase, the improvement comprising: incorporating, into the water phase prior to contact with the prepolymer in the foam-forming reaction, a water-dispersible and combustible organic carbon compound selected from the group consisting of a phenol having at least 2 hydroxyl groups per mole, starch, lignin, and wood cellulose, said carbon compound providing an essentially neutral pH when dissolved or dispersed in water, said carbon compound being present from about 5 to about 30 parts by weight based on 100 parts by weight of the prepolymer, provided that when said carbon compound is wood cellulose it is present from about 2 to about 10 parts by weight of the prepolymer, and said carbon compound not functioning as a gelatinizing agent at the concentration employed.

2. A foam as in claim 1, wherein the foam-forming reaction is carried out in the presence of a non-ionic suspending agent for the alumina hydrate with said suspending agent being carried in the water phase in an amount not exceeding about 2 parts per 100 parts of the prepolymer.

3. A foam as in claim 1, wherein the prepolymer is a mixture of a polyoxyethylene glycol and a polyhydric alcohol containing 3 or 4 hydroxyl groups per mole, said hydroxyl groups of the glycol and polyol being reacted with sufficient polyisocyanate to cap all of said hydroxyl groups.

4. A foam as in claim 1, wherein the alumina hydrate has an average particle size of about 0.5 to about 120 microns.

5. A foam as in claim 1, wherein the phosphorous compound is ammonium polyphosphate.

6. A foam as in claim 1, wherein the carbon compound is a phenol having at least 2 hydroxyl groups per mole.

7. A foam as in claim 1, wherein the carbon compound is starch.

8. A foam as in claim 1, wherein the carbon compound is lignin.

9. A foam as in claim 1, wherein the carbon compound is wood cellulose.

10. A foam as in claim 9, wherein the wood cellulose is present from about 2 to about 5 parts by weight of the prepolymer.

11. In a crosslinked hydrophilic flame-retardant polyurethane foam prepared by reacting a hydrophilic polyoxyalkylene urethane prepolymer under foam-forming conditions with at least 20 moles of water for every mole of NCO groups in the prepolymer and in the presence of alumina hydrate having an average particle size of about 0.5 to about 120 microns and ammonium polyphosphate with said alumina hydrate carried in the water phase and said prepolymer being a mixture of a polyethylene glycol and a polyhydric alcohol containing 3 or 4 hydroxyl groups per mole, said hydroxyl groups of the glycol and polyol being reacted with sufficient polyisocyanate to cap all of said hydroxyl groups, the improvement comprising: incorporating wood cellulose into the water phase prior to contact with the prepolymer in the foam-forming reaction in an amount of from about 2 to about 5 parts by weight of wood cellulose based on 100 parts by weight of the prepolymer.

12. In a method for preparing a crosslinked hydrophilic foam-retardant polyurethane foam by reacting a hydrophilic polyoxyalkylene urethane prepolymer under foam-forming conditions with at least 20 moles of water for every mole of NCO groups in the prepolymer and in the presence of alumina hydrate and a phosphorous fire-retardant compound with said alumina hydrate carried in the water phase, the improvement comprising: incorporating into the foam-forming reaction from about 5 to about 30 parts, based on 100 parts by weight of the prepolymer, of a water-dispersible and combustible organic carbon compound selected from the group consisting of a phenol having at least 2 hydroxyl groups per mole, starch, lignin, and wood cellulose, said carbon compound providing an essentially neutral pH when dissolved or dispersed in water, said carbon compound being present from about 5 to about 30 parts by weight based on 100 parts by weight of the prepolymer, provided that when said carbon compound is wood cellulose it is present from about 2 to about 10 parts by weight based on 100 parts by weight of the prepolymer, and said carbon compound not functioning as a gellatinizing agent at the concentration employed.

13. A method as in claim 12, wherein the foam-forming reaction is carried out in the presence of a non-ionic suspending agent for the alumina hydrate with said suspending agent being carried in the water phase in an amount not exceeding about 2 parts per 100 parts of the prepolymer.

14. A method as in claim 12, wherein the prepolymer is a mixture of a polyoxyethylene glycol and a polyhydric alcohol containing 3 or 4 hydroxyl groups per mole, said hydroxyl groups of the glycol and polyol being reacted with sufficient polyisocyanate to cap all of said hydroxyl groups.

15. A method as in claim 12, wherein the alumina hydrate has an average particle size of about 0.5 to about 120 microns.

16. A method as in claim 12, wherein the phosphorous compound is ammonium polyphosphate.

17. A method as in claim 12, wherein the carbon compound is a phenol having at least 2 hydroxyl groups per mole.

18. A method as in claim 12, wherein the carbon compound is starch.

19. A method as in claim 12, wherein the carbon compound is lignin.

20. A method as in claim 12, wherein the carbon compound is wood cellulose.

21. A method as in claim 20, wherein the wood cellulose is present from about 2 to about 5 parts by weight based on 100 parts by weight of the prepolymer.

22. A method as in claim 12, wherein the foam is formed at about ambient temperature.

23. In a method for preparing a crosslinked hydrophilic flame-retardant polyurethane foam by reacting a hydrophilic polyoxyalkylene urethane prepolymer under foam-forming conditions with at least 20 moles of water for every mole of NCO groups in the prepolymer and in the presence of alumina hydrate having an average particle size of about 0.5 to about 120 microns and ammonium polyphosphate with said alumina hydrate carried in the water phase and said prepolymer being a mixture of a polyethylene glycol and a polyhydric alcohol containing 3 or 4 hydroxyl groups per mole, said hydroxyl groups of the glycol and polyol being reacted with sufficient polyisocyanate to cap all of said hydroxyl groups, the improvement comprising: incorporating wood cellulose into the foam-forming reaction in an amount of from about 2 to about 5 parts, based on 100 parts by weight of the prepolymer.

24. A mattress of cellular resilient elastomeric material comprising a crosslinked hydrophilic flame-retardant polyurethane foam as defined in claim 1.

25. A mattress of cellular resilient elastomeric material comprising a crosslinked hydrophilic flame-retardant polyurethane foam as defined in claim 11.

26. A seat cushion of cellular resilient elastomeric material comprising a crosslinked hydrophilic flame-retardant polyurethane foam as defined in claim 1.

27. A seat cushion of cellular resilient elastomeric material comprising a crosslinked hydrophilic flame-retardant polyurethane foam as defined in claim 11.

* * * * *